United States Patent
Zhou et al.

(10) Patent No.: US 11,967,275 B1
(45) Date of Patent: Apr. 23, 2024

(54) LIGHT-EMITTING DRIVE CIRCUIT, METHOD FOR TIMING CONTROL, AND DISPLAY PANEL

(71) Applicant: HKC CORPORATION LIMITED, Shenzhen (CN)

(72) Inventors: Xiufeng Zhou, Shenzhen (CN); Xin Yuan, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/352,483

(22) Filed: Jul. 14, 2023

(30) Foreign Application Priority Data

Mar. 3, 2023 (CN) .......................... 202310197985.0

(51) Int. Cl.
  *G09G 3/3225* (2016.01)
(52) U.S. Cl.
  CPC ... *G09G 3/3225* (2013.01); *G09G 2300/0426* (2013.01); *G09G 2310/08* (2013.01)
(58) Field of Classification Search
  CPC ..... G11C 19/00–38; G09G 3/32–3291; G09G 2310/0286–0289
  See application file for complete search history.

(56) References Cited

U.S. PATENT DOCUMENTS

| | | | | |
|---|---|---|---|---|
| 2010/0201668 A1* | 8/2010 | Ko | ....................... | G09G 3/3677 345/55 |
| 2011/0157263 A1* | 6/2011 | Kim | ..................... | G09G 3/3677 345/698 |
| 2016/0172054 A1 | 6/2016 | Shao et al. | | |
| 2016/0267864 A1 | 9/2016 | Xiao | | |
| 2017/0249893 A1* | 8/2017 | Kim | ..................... | G09G 3/3266 |
| 2017/0270892 A1 | 9/2017 | Wang | | |
| 2017/0287395 A1 | 10/2017 | Jang | | |

(Continued)

FOREIGN PATENT DOCUMENTS

| | | |
|---|---|---|
| CN | 103943081 A | 7/2014 |
| CN | 106128364 A | 11/2016 |

(Continued)

OTHER PUBLICATIONS

Ci et al. "Design of Human-Machine Interface of Intelligent Electric Actuator Based on LPC2136", Automation & Instrumentation. 2009, vol. 5, 4 pages (partial English translation provided).

*Primary Examiner* — Roberto W Flores
(74) *Attorney, Agent, or Firm* — Maier & Maier, PLLC

(57) ABSTRACT

A light-emitting drive circuit, which includes cascaded N light-emitting drive sub-circuits, and an n-th light-emitting drive sub-circuit, includes: a first pull-up control sub-circuit configured to pull up a potential of a first node to a first potential in a trigger phase; a first pull-down control sub-circuit configured to pull down the potential of the first node to a second potential in an output phase and pull up the potential of the first node to a third potential in a reset phase; a pull-up sub-circuit configured to pull up an n-th stage light-emitting drive signal to a high potential; a second pull-down control sub-circuit configured to pull up a potential of a second node to a fourth potential in the output phase; and a pull-down sub-circuit configured to pull down the n-th stage light-emitting drive signal to a low potential.

17 Claims, 2 Drawing Sheets

(56) References Cited

U.S. PATENT DOCUMENTS

| | | | | |
|---|---|---|---|---|
| 2020/0357318 A1* | 11/2020 | Zhang | ................... | G11C 19/28 |
| 2021/0407381 A1* | 12/2021 | Park | ...................... | G09G 3/32 |
| 2022/0309998 A1* | 9/2022 | Lim | ................... | G09G 3/3266 |
| 2022/0328008 A1* | 10/2022 | Song | ................... | G09G 3/3233 |

FOREIGN PATENT DOCUMENTS

| | | | |
|---|---|---|---|
| CN | 106205520 | A | 12/2016 |
| CN | 107154236 | A | 9/2017 |
| CN | 107305759 | A | 10/2017 |
| CN | 108538336 | A | 9/2018 |
| CN | 109427297 | A | 3/2019 |
| CN | 111415695 | A | 7/2020 |
| CN | 112017591 | A | 12/2020 |
| CN | 113113071 | A | 7/2021 |
| CN | 113257205 | A | 8/2021 |
| CN | 114067729 | A | 2/2022 |
| CN | 114299848 | A | 4/2022 |
| CN | 114613335 | A | 6/2022 |
| CN | 114974062 | A | 8/2022 |
| CN | 114974163 | A | 8/2022 |
| CN | 115148166 | A | 10/2022 |
| CN | 115881038 | A | 3/2023 |
| KR | 1020160067307 | A | 6/2016 |
| WO | 2022241821 | A1 | 11/2022 |

\* cited by examiner

LIGHT-EMITTING DRIVE CIRCUIT, METHOD FOR TIMING CONTROL, AND DISPLAY PANEL

CROSS-REFERENCE TO RELATED APPLICATION

Pursuant to 35 U.S.C. § 119 and the Paris Convention, this application claims the benefit of Chinese Patent Application No. 202310197985.0 filed on Mar. 3, 2023, the content of which is incorporated herein by reference.

TECHNICAL FIELD

The present application relates to the field of display technology, and in particular, to a light-emitting drive circuit, a method for timing control, and a display panel.

BACKGROUND

The statements provided herein are merely background information related to the present application, and do not necessarily constitute any prior arts. Light-emitting devices, such as an organic light-emitting diode (OLED), due to their characteristics such as, thin and lightness, energy efficient, wide viewing angle, wide color gamut and high contrast, have gradually been widely used in televisions, mobile phones, notebooks and other products.

The OLED, when being an active-driven emitting-light device, usually requires a light-emitting drive circuit to provide a corresponding light-emitting control signal, in addition to requiring a row-scanning drive circuit to provide a corresponding scanning signal.

However, circuit configurations of conventional light-emitting drives are complicated, and more modules or components are required to realize a control of the light-emitting control signal for the conventional light-emitting drives.

SUMMARY

In view of this, embodiments of the present application provide a light-emitting drive circuit, a method for timing control, and a display panel, so as to reduce the complexity of structure of the light-emitting drive circuit.

To achieve the above objective, in accordance with a first aspect, an embodiment of the present application provides a light-emitting drive circuit, which includes: N light-emitting drive sub-circuits cascaded, and an n-th light-emitting drive sub-circuit includes: a first pull-up control sub-circuit, a pull-up sub-circuit, a first pull-down control sub-circuit, a second pull-down control sub-circuit and a pull-down sub-circuit, where, $n \in [1, N]$.

An input of the first pull-up control sub-circuit is configured to be connected to a first power supply, a control end of the first pull-up control sub-circuit is configured to receive a first clock signal and a (n+1)-th stage light-emitting drive signal, and an output of the first pull-up control sub-circuit is in electrical connection with a first node. The first pull-up control sub-circuit is configured to pull up a potential of the first node to a first potential in a trigger phase.

An input of the first pull-down control sub-circuit is configured to receive a (n−1)-th stage light-emitting drive signal, a control end of the first pull-down control sub-circuit is configured to receive a second clock signal, and an output of the first pull-down control sub-circuit is in electrical connection with the first node. The first pull-down control sub-circuit is configured to pull down the potential of the first node to a second potential in an output phase and to pull up the potential of the first node to a third potential in a reset phase.

An input of the pull-up sub-circuit is configured to be connected to the first power supply, a control end of the pull-up sub-circuit is in electrical connection with a first node, and an output of the pull-up sub-circuit is in electrical connection with a light-emitting drive-signal output. The pull-up sub-circuit is configured to pull up a n-th stage light-emitting drive-signal output from the light-emitting drive-signal output to a high potential in a case that a potential of the first node is the first potential or the third potential. An input of the second pull-down control sub-circuit is configured to receive the first clock signal and to be connected to the first power supply respectively, a control end of the second pull-down control sub-circuit is configured to be connected to the first node and receive the second clock signal respectively, and an output of the second pull-down control sub-circuit is in electrical connection with a second node. The second pull-down control sub-circuit is configured to pull up a potential of the second node to a fourth potential in the output phase.

An input of the pull-down sub-circuit is configured to be connected to a second power supply, a control end of the pull-down sub-circuit is in electrical connection with the second node, and an output of the pull-down sub-circuit is in electrical connection with the light-emitting drive-signal output. The pull-down sub-circuit is configured to pull down the n-th stage light-emitting drive-signal output from the light-emitting drive-signal output to a low potential in a case that the potential of the second node is the fourth potential.

As an optional implementation of the embodiment of the present application, the n-th light-emitting drive sub-circuit further includes a second pull-up control sub-circuit.

An end of the second pull-up control sub-circuit is in electrical connection with the control end of the pull-up sub-circuit, and another end of the second pull-up control sub-circuit is in electrical connection with the light-emitting drive-signal output. The second pull-up control sub-circuit is configured to pull up the potential of the first node from the first potential to a fifth potential in the reset phase, and the pull-up sub-circuit is configured to pull up a potential of the n-th stage light-emitting drive-signal output from the light-emitting drive-signal output in a case that the potential of the first node is the fifth potential.

As an optional implementation of the embodiment of the present application, the second pull-up control sub-circuit includes a first capacitor, one end of the first capacitor is in electrical connection with the control end of the pull-up sub-circuit, and the other end is in electrical connection with the light-emitting drive-signal output.

As an optional implementation of the embodiment of the present application, the first pull-up control sub-circuit includes: a first transistor and a second transistor.

A control electrode of the first transistor is configured to receive the first clock signal, a first electrode of the first transistor is in electrical connection with the first power supply, and a second electrode of the first transistor is in electrical connection with a first electrode of the second transistor.

A control electrode of the second transistor is configured to receive the (n+1)-th stage light-emitting drive signal, and a second electrode of the second transistor is in electrical connection with the first node.

As an optional implementation of the embodiment of the present application, the second pull-down control sub-circuit includes: a third transistor, a fourth transistor, and a second capacitor.

A control electrode of the third transistor is in electrical connection with the first node, a first electrode of the third transistor is configured to receive the first clock signal, a second electrode of the third transistor is in electrical connection with a first electrode of the fourth transistor.

A control electrode of the fourth transistor is configured to receive the second clock signal, and a second electrode of the fourth transistor is in electrical connection with the second node.

An end of the second capacitor is in electrical connection with the first power supply, and another end of the second capacitor is in electrical connection with the second electrode of the third transistor.

As an optional implementation of the embodiment of the present application, the n-th light-emitting drive sub-circuit further includes: a first maintenance sub-circuit and a second maintenance sub-circuit.

An input of the first maintenance sub-circuit is configured to be connected to the second power supply, a control end of the first maintenance sub-circuit is in electrical connection with the first node, and an output of the first maintenance sub-circuit is in electrical connection with the second node. The first maintenance sub-circuit is configured to maintain the potential of the second node in a case that the potential of the first node is the first potential.

An input of the second maintenance sub-circuit is configured to be connected to the second power supply, a control end of the second maintenance sub-circuit is in electrical connection with the second node, and an output of the second maintenance sub-circuit is in electrical connection with the first node. The second maintenance sub-circuit is configured to maintain the potential of the first node in a case that the potential of the second node is the fourth potential.

As an optional implementation of the embodiment of the present application, the first maintenance sub-circuit includes a fifth transistor, a first electrode of the fifth transistor is in electrical connection with the second power supply, a control electrode of the fifth transistor is in electrical connection with the first node, and a second electrode of the fifth transistor is in electrical connection with the second node.

The second maintenance sub-circuit includes a sixth transistor, a first electrode of the sixth transistor is in electrical connection with the second power supply, a control electrode of the sixth transistor is in electrical connection with the second node, and a second electrode of the sixth transistor is in electrical connection with the first node.

As an optional implementation of the embodiment of the present application, the n-th light-emitting drive sub-circuit further includes a current stabilization sub-circuit.

An input of the current stabilization sub-circuit is in electrical connection with the first node, a control end of the current stabilization sub-circuit is in electrical connection with the first power supply, and an output of the current stabilization sub-circuit is in electrical connection with the control end of the second pull-down control sub-circuit. The current stabilization sub-circuit is configured to stabilize a current at the control end of the pull-up sub-circuit.

In accordance with a second aspect, an embodiment of the present application provides a method for timing control, which is applied to the light-emitting drive circuit according to the first aspect or any one of the first aspect, and the method includes the following phases.

In a trigger phase, a second clock signal line is controlled to output a low-potential second clock signal, to enable the first pull-down control sub-circuit to be switched off; a first clock signal line is controlled to output a high-potential first clock signal, to enable the first pull-up control sub-circuit to be switched on when the (n+1)-th stage light-emitting drive signal is at a high potential, so that the potential of the first node is pulled up to the first potential, and the second pull-down control sub-circuit is charged.

In an output phase, the first clock signal line is controlled to output a low-potential first clock signal, to enable the first pull-up control sub-circuit to be switched off; the second clock signal line is controlled to output a high-potential second clock signal, to enable the first pull-down control sub-circuit to be switched on, so that the second pull-down control sub-circuit is discharged, and the potential of the second node is pulled up to the fourth potential.

In a reset phase, the second clock signal line is controlled to output the high-potential second clock signal, to enable the first pull-down control sub-circuit to be switched on when the (n−1)-th stage light-emitting drive signal is at a high potential, so that the potential of the first node is pulled up to the third potential.

In accordance with a third aspect, an embodiment of the present application provides a display panel, including the light-emitting drive circuit described in the first aspect or any one of the first aspect and a plurality of pixel drive circuits connected to the light-emitting drive circuit. The light-emitting drive circuit is configured to output corresponding light-emitting drive signals to each of the pixel drive circuits.

The technical solution provided by the embodiment of the present application includes cascaded N light-emitting drive sub-circuits, and an n-th light-emitting drive sub-circuit includes: a first pull-up control sub-circuit, a pull-up sub-circuit, a first pull-down control sub-circuit, and a second pull-down control sub-circuit and a pull-down sub-circuit, $n \in [1, N]$. An input of the first pull-up control sub-circuit is configured to be connected to a first power supply, a control end of the first pull-up control sub-circuit is configured to receive a first clock signal and a (n+1)-th stage light-emitting drive signal, and an output of the first pull-up control sub-circuit is in electrical connection with a first node. The first pull-up control sub-circuit is configured to pull up a potential of the first node to a first potential in a trigger phase. An input of the first pull-down control sub-circuit is configured to receive a (n−1)-th stage light-emitting drive signal, a control end of the first pull-down control sub-circuit is configured to receive a second clock signal, and an output of the first pull-down control sub-circuit is in electrical connection with the first node. The first pull-down control sub-circuit is configured to pull down the potential of the first node a second potential in an output phase, and to pull up the potential of the first node to a third potential in a reset phase. An input of the pull-up sub-circuit is configured to be connected to the first power supply, a control end of the pull-up sub-circuit is in electrical connection with the first node, and an output of the pull-up sub-circuit is in electrical connection with a light-emitting drive-signal output. The pull-up sub-circuit is configured to pull up a n-th stage light-emitting drive-signal output from the light-emitting drive-signal output to a high potential in a case that the potential of the first node is the first potential or the third potential. An input of the second pull-down control sub-circuit is configured to receive the first clock signal and to be connected to the first power supply, respectively, a control end of the second pull-down control sub-circuit is configured to be connected to the first node and to receive the second clock signal respectively, and an output of the second pull-down control sub-circuit is in electrical connection with the second node. The second pull-down control sub-circuit is configured to pull up the potential of the second node to a fourth potential in the output phase. An input of the pull-down sub-circuit is configured to be connected to the second power supply, a control end of the pull-down sub-circuit is in electrical connection with the second node, and an output of the pull-down sub-circuit is in electrical connection with the light-emitting drive-signal output. The pull-down sub-circuit is configured to pull down the n-th stage light-emitting drive-signal output from the light-emitting drive-signal output to a low potential in a case that the potential of the second node is the fourth potential. In the above solution, the light-emitting drive sub-circuit of each stage can modulate a desired light-emitting control signal through the first pull-up control sub-circuit, the pull-up sub-circuit, the first pull-down control sub-circuit, the second pull-down control sub-circuit, the pull-down sub-circuit and their corresponding connection relations, only a small number of sub-circuits is adopted, thereby the architecture of the light-emitting drive circuit can be simplified and thus the complexity of the light-emitting drive circuit architecture is reduced.

DETAILED DESCRIPTION OF EMBODIMENTS

Embodiments of the present application are described below with reference to the drawings in the embodiments of the present application. The terms used in implementations of the embodiments of the present application are only used to explain the specific embodiments of the present application, and are not intended to limit the present application. The following specific embodiments may be combined with each other, and the same or similar concepts or processes may not be repeated in some embodiments.

The light-emitting device in the embodiments of the present application may be any one of an OLED, a quantum dot light-emitting diode (QLED) and a sub-millimeter light-emitting diode (Mini Light Emitting Diodes, Mini LED). In the following, the embodiment will take the OLED as an example for exemplary description.

Figure 1:
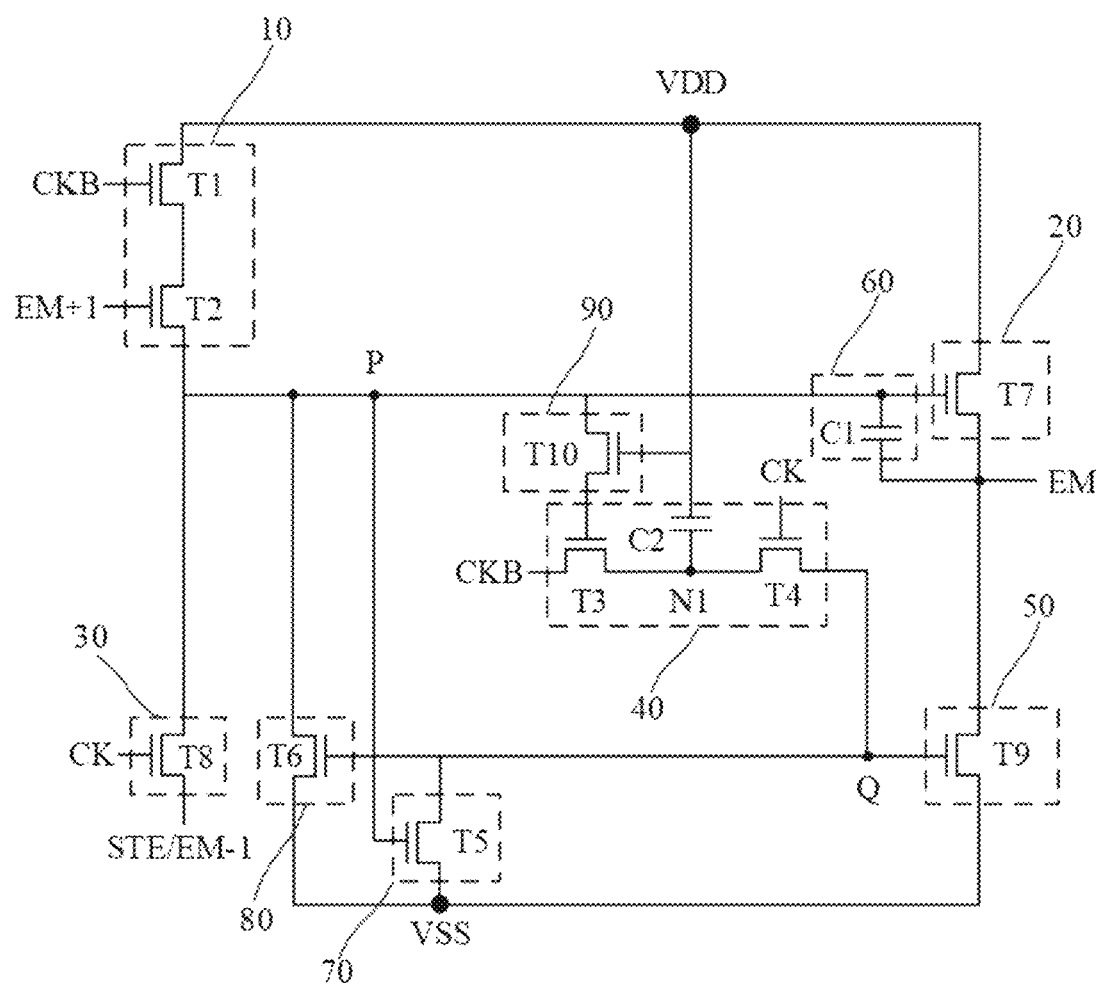
FIG. 1 is a schematic diagram of a circuit structure of an n-th light-emitting drive sub-circuit in a light-emitting drive circuit provided by an embodiment of the present application.

FIG. 1 is a schematic diagram of a circuit structure of an n-th light-emitting drive sub-circuit in a light-emitting drive circuit provided by an embodiment of the present application. The light-emitting drive circuit provided by the embodiment of the present application may include cascaded N light-emitting drive sub-circuits, n∈[1, N]. As shown in FIG. 1, the n-th light-emitting drive sub-circuit provided by the embodiment of the present application may include: a first pull-up control sub-circuit 10, a pull-up sub-circuit 20, a first pull-down control sub-circuit 30, a second pull-down control sub-circuit 40 and a pull-down sub-circuit 50.

An input of the first pull-up control sub-circuit 10 is configured to be connected to a first power supply VDD, and a control end of the first pull-up control sub-circuit 10 is configured to receive a first clock signal CKB and a (n+1)-th stage light-emitting drive signal EM+1. An output of the pull-up control sub-circuit 10 is in electrical connection with a first node P, and the first pull-up control sub-circuit is configured to pull up a potential of the first node P to a first potential in a trigger phase. The first power supply VDD may be a DC power supply and output a high-potential voltage, and the first potential may be a high potential.

It can be understood that when n=N, the control end of the first pull-up control sub-circuit 10 is configured to receive the first clock signal CKB and a pull-up signal. The pull-up signal and the first clock signal CKB jointly control the first pull-up control sub-circuit 10 to be switched on, so that the potential of the first node P is pulled up to the first potential.

An input of the first pull-down control sub-circuit 30 is configured to receive a (n−1)-th stage light-emitting drive signal EM-1 (when n=1, the input of the first pull-down control sub-circuit 30 is configured to receive a start signal STE). A control end of the first pull-down control sub-circuit 30 is configured to receive a second clock signal CK. An output of the first pull-down control sub-circuit 30 is in electrical connection with the first node P, and the first pull-down control sub-circuit 30 is configured to pull down the potential of the first node P to a second potential in an output phase, and to pull up the potential of the first node P to a third potential in a reset phase. A phase of the second clock signal CK is opposite to that of the first clock signal CKB, the second potential is a low potential, and the third potential is a high potential.

An input of the pull-up sub-circuit 20 is configured to be connected to the first power supply VDD, a control end of the pull-up sub-circuit 20 is in electrical connection with the first node P, and an output of the pull-up sub-circuit 20 is in electrical connection with a light-emitting drive-signal output. The pull-up sub-circuit 20 is configured to pull up a n-th stage light-emitting drive signal EM output from the light-emitting drive-signal output to a high potential in a case that the potential of the first node P is the first potential or the third potential (that is, in the trigger phase or the reset phase).

An input of the second pull-down control sub-circuit 40 is configured to receive the first clock signal CKB and to be connected to the first power supply VDD respectively, and a control end of the second pull-down control sub-circuit 40 is configured to be connected to the first node P and to receive the second clock signal CK respectively. An output of the second pull-down control sub-circuit 40 is in electrical connection with a second node Q, and the second pull-down control sub-circuit 40 is configured to pull up a potential of the second node Q to a fourth potential in the output phase. The fourth potential is a high potential.

An input of the pull-down sub-circuit 50 is configured to be connected to a second power supply VSS, a control end of the pull-down sub-circuit 50 is in electrical connection with the second node Q, and an output of the pull-down sub-circuit 50 is in electrical connection with the light-emitting drive-signal output. The pull-down sub-circuit 50 is configured to pull down the n-th stage light-emitting drive signal EM output from the light-emitting drive-signal output to a low potential in a case that the potential of the second node Q is the fourth potential (that is, in the output phase). The second power supply VSS may be a DC power supply, and output a low-potential voltage.

The light-emitting drive-signal output of the n-th stage light-emitting drive sub-circuit outputs the n-th stage light-emitting drive signal EM of high potential in the trigger phase and the reset phase, and outputs the n-th stage light-emitting drive signal EM of a low potential in the output phase. In this way, the n-th stage light-emitting drive sub-circuit is enabled to modulate a desired light-emitting control signal (that is, the n-th stage light-emitting drive signal EM) through the first pull-up control sub-circuit 10, the pull-up sub-circuit 20, the first pull-down control sub-circuit 30, the second pull-down control sub-circuit 40, the pull-down sub-circuit 50 and the corresponding connection relations between the above five sub-circuits. Since only 5 sub-circuits are used, the architecture of the light-emitting drive circuit is enabled to be simplified, and thus the complexity of the light-emitting drive circuit architecture can be reduced.

The n-th light-emitting drive sub-circuit may also include a second pull-up control sub-circuit 60, one end of the second pull-up control sub-circuit 60 is in electrical connection with the control end of the pull-up sub-circuit 20, and the other end is in electrical connection with the light-emitting drive-signal output. The pull-up control sub-circuit 60 is configured to pull up the potential of the first node P from the first potential to a fifth potential in the reset phase. The fifth potential is a high potential and is higher than the first potential. The pull-up sub-circuit 20 may pull up the potential of the n-th stage light-emitting drive signal EM output from the light-emitting drive-signal output in a case that the potential of the first node P is the fifth potential. Since the first node P is in electrical connection with the control end of the pull-up sub-circuit 20, the potential of the first node P is the potential at the control end of the pull-up sub-circuit 20. That is to say, the potential of the control end of the pull-up sub-circuit 20 will be pulled up by the second pull-up control sub-circuit 60 from the first potential to the fifth potential in the reset phase, so that the pull-up sub-circuit 20 is enabled to pull up the potential of the n-th stage light-emitting drive signal EM to be closer to an ideal value (that is, the potential of the first power supply VDD).

The n-th light-emitting drive sub-circuit may also include a first maintenance sub-circuit 70 and a second maintenance sub-circuit 80. An input of the first maintenance sub-circuit 70 is configured to be connected to the second power supply VSS, a control end of the first maintenance sub-circuit 70 is in electrical connection with the first node P, and an output of the first maintenance sub-circuit 70 is in electrical connection with the second node Q. The first maintenance sub-circuit 70 is enabled to maintain the low potential of the second node Q in a case that the potential of the first node P is the first potential or the fifth potential (that is, in the trigger stage), so that the pull-down sub-circuit 50 continues to be switched off, and the light-emitting drive-signal output is enabled to output only the n-th stage light-emitting drive signal EM of high potential.

An input of the second maintenance sub-circuit 80 is configured to be connected to the second power supply VSS, a control end of the second maintenance sub-circuit 80 is in electrical connection with the second node Q, and an output of the second maintenance sub-circuit 80 is in electrical connection with the first node P. The second maintenance sub-circuit 80 is enabled to maintain the low potential of the first node P in a case that the potential of the second node Q is the fourth potential (that is, in the output phase), so that the pull-up sub-circuit 20 continues to be switched off, and the light-emitting drive-signal output is enabled to output only the n-th stage light-emitting drive signal EM of low potential.

The n-th light-emitting drive sub-circuit may also include a current stabilization sub-circuit 90, an input of the current stabilization sub-circuit 90 is in electrical connection with the first node P, a control end of the current stabilization sub-circuit 90 is in electrical connection with the first power supply VDD, and an output of the current stabilization sub-circuit 90 is in electrical connection with the second pull-down control sub-circuit 40. The current stabilization sub-circuit 90 is enabled to stabilize a current at the control end of the pull-up sub-circuit 20, so that the pull-up sub-circuit 20 can pull up the potential of the n-th stage light-emitting drive signal EM in a more stable manner, and thus the n-th stage light-emitting drive signal EM output from the light-emitting drive-signal output after being pulled up is also more stable.

To be specific, the first pull-up control sub-circuit 10 may include a first transistor T1 and a second transistor T2. A control electrode of the first transistor T1 is configured to receive the first clock signal CKB, a first electrode of the first transistor T1 is in electrical connection with the first power supply VDD, and a second electrode of the first transistor T1 is in electrical connection with a first electrode of the second transistor T2.

A control electrode of the second transistor T2 is configured to receive the (n+1)-th stage light-emitting drive signal EM+1, and a second electrode of the second transistor T2 is in electrical connection with the first node P.

The pull-up sub-circuit 20 may include a seventh transistor T7. A control electrode of the seventh transistor T7 is in electrical connection with the first node P, a first electrode of the seventh transistor T7 is configured to be connected to the first power supply VDD, and a second electrode of the seventh transistor T7 is in electrical connection with the light-emitting drive-signal output.

The first pull-down control sub-circuit 30 may include an eighth transistor T8. A control electrode of the eighth transistor T8 is configured to receive the second clock signal CK, a first electrode of the eighth transistor T8 is configured to receive the (n−1)-th stage light-emitting drive signal EM-1 (When n=1, the first electrode of the eighth transistor T8 is configured to receive the start signal STE), and a second electrode of the eighth transistor T8 is in electrical connection with the first node P.

The second pull-down control sub-circuit 40 may include a third transistor T3, a fourth transistor T4 and a second capacitor C2. A control electrode of the third transistor T3 is in electrical connection with the first node P, a first electrode of the third transistor T3 is configured to receive the first clock signal CKB, and a second electrode of the third transistor T3 is in electrical connection with a first electrode of the fourth transistor T4.

A control electrode of the fourth transistor T4 is configured to receive the second clock signal CK, and a second electrode of the fourth transistor T4 is in electrical connection with the second node Q.

One end of the second capacitor C2 is in electrical connection with the first power supply VDD, and the other end of the second capacitor C2 is in electrical connection with the second electrode of the third transistor T3.

The pull-down sub-circuit 50 may include a ninth transistor T9. A control electrode of the ninth transistor T9 is in electrical connection with the second node Q, a first electrode of the ninth transistor T9 is configured to be connected to the second power supply VSS, and a second electrode of the ninth transistor T9 is in electrical connection with the light-emitting drive-signal output.

The second pull-up control sub-circuit 60 may include a first capacitor C1, one end of the first capacitor C1 is in electrical connection with the control electrode of the seventh transistor T7, and the other end is in electrical connection with the light-emitting drive-signal output.

The first maintenance sub-circuit 70 may include a fifth transistor T5. A first electrode of the fifth transistor T5 is in electrical connection with the second power supply VSS, a control electrode of the fifth transistor T5 is in electrical connection with the first node P, and a second electrode of the fifth transistor T5 is in electrical connection with the second node Q.

The second maintenance sub-circuit 80 may include a sixth transistor T6. A first electrode of the sixth transistor T6 is in electrical connection with the second power supply VSS, a control electrode of the sixth transistor T6 is in electrical connection with the second node Q, and a second electrode of the sixth transistor T6 electrode is in electrical connection with the first node P.

The current stabilization sub-circuit 90 may include a tenth transistor. A control electrode of the tenth transistor is in electrical connection with the first power supply VDD, a first electrode of the tenth transistor is in electrical connection with the first node P, and a second electrode of the tenth transistor is in electrical connection with the control electrode of the third transistor T3.

The first transistor T1, the second transistor T2, the fourth transistor T4 and the eighth transistor T8 may be PMOS transistors or NMOS transistors. When a transistor is a PMOS transistor, the first electrode of the transistor is the source, the second electrode of the transistor is the drain, and the control electrode of the transistor is the gate; when a transistor is an NMOS transistor, the first electrode of the transistor is the drain, the second electrode of the transistor is the source, and the control electrode of the transistor is the gate. In this embodiment, the foregoing transistors are all NMOS transistors, as an example for exemplary illustrations.

An embodiment of the present application also provides a method for timing control, which is applied to the above-mentioned light-emitting drive circuit. In the trigger phase, a second clock signal CK line is controlled to output a low-potential second clock signal CK, to enable the first pull-down control sub-circuit 30 to be switched off; a first clock signal CKB line is controlled to output a high-potential first clock signal CKB, to enable the first pull-up control sub-circuit 10 to be switched on when the (n+1)-th stage light-emitting drive signal EM+1 is at a high potential, so that the potential of the first node P is pulled up to the first potential, and the second pull-down control sub-circuit 40 is charged.

In the output phase, the first clock signal CKB line is controlled to output a low-potential first clock signal CKB, to enable the first pull-up control sub-circuit 10 to be switched off; the second clock signal CK line is controlled to output a high-potential second clock signal CK, to enable the first pull-down control sub-circuit 30 to be switched on, so that the second pull-down control sub-circuit 40 is discharged, and the potential of the second node Q is pulled up to the fourth potential.

In the reset phase, the second clock signal CK line is controlled to output the high-potential second clock signal CK, to enable the first pull-down control sub-circuit 30 to be switched on when the (n−1)-th stage light-emitting drive signal EM-1 is at a high potential, so that the potential of the first node P is pulled up to the third potential.

Figure 2:
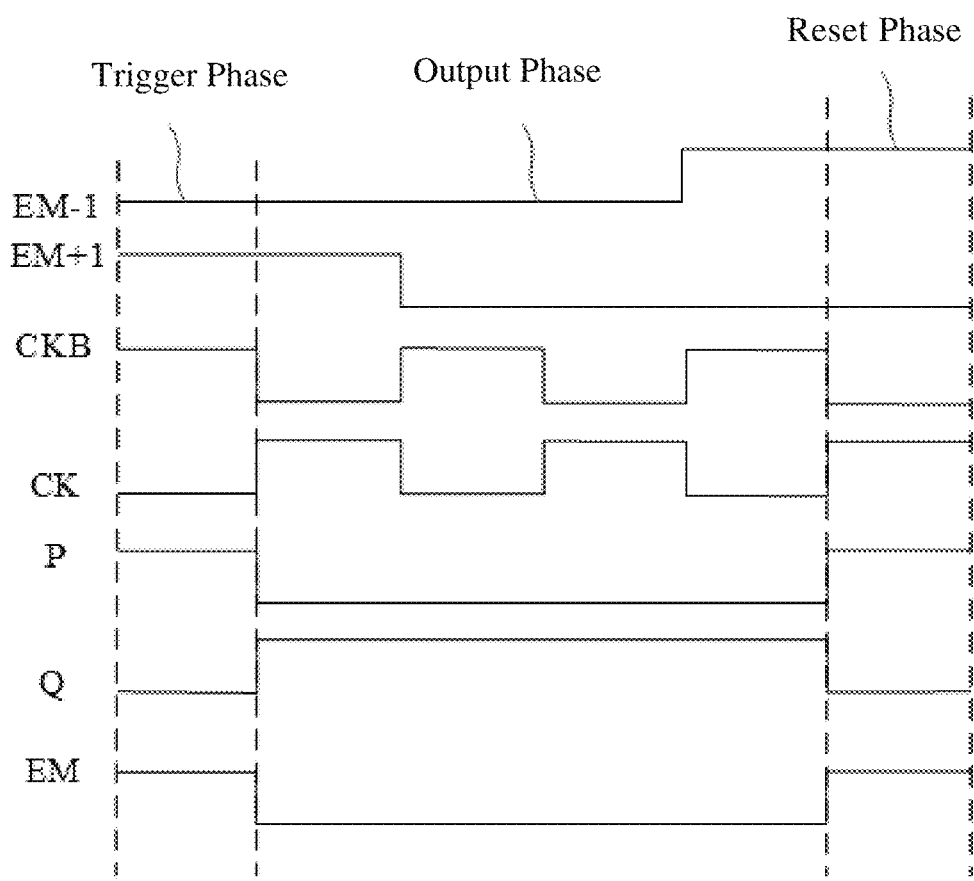
FIG. 2 is an operation timing diagram of the light-emitting drive sub-circuit controlled by a method for timing control provided by an embodiment of the present application.

FIG. 2 is an operation timing diagram of the light-emitting drive sub-circuit controlled by the method for timing control provided by an embodiment of the present application. As shown in FIG. 2, in the trigger phase, the second clock signal CK is at a low potential, and the fourth transistor T4 and the eighth transistor T8 are switched off. The first clock signal CKB and the (n+1)-th stage light-emitting drive signal EM+1 are at a high potential, the first transistor T1 and the second transistor T2 are switched on, the potential of the first node P is pulled up to the first potential, and the first capacitor C1 is charged, the seventh transistor T7 is switched on, the high potential of the first power supply VDD is written into the light-emitting drive-signal output via the switched-on seventh transistor T7, and the n-th stage light-emitting drive signal EM of high-potential is output from the light-emitting drive-signal output. At the same time, the high potential of the first node P enables the third transistor T3 to be switched on, the second capacitor C2 is charged, and the high-potential first clock signal CKB is written into a node N1 via the third transistor T3, and the node N1 is maintained at a high potential to complete an action of signal temporary storage, the potential of the second node Q remains at a low potential, and the ninth transistor T9 is switched off. In addition, the high potential of the first node P also enables the fifth transistor T5 to be switched on, and the low potential of the second power supply VSS is written into the second node Q to maintain the low potential of the second node Q, so that the ninth transistor T9 continuous to be switched off.

At the beginning of the output phase, the potential of the first clock signal CKB is changed to a low potential, the first transistor T1 is switched off. The potential of the second clock signal CK is changed to a high potential, the eighth transistor T8 is switched on, and the (n−1)-th stage light-emitting drive signal EM-1 of low potential (that is, the second potential) is written into the first node P, the third transistor T3 and the seventh transistor T7 are switched off. The fourth transistor T4 is switched on, the second capacitor C2 is discharged, the high potential of the node N1 (that is, the fourth potential) is written into the second node Q, the ninth transistor T9 is switched on, and the low potential of the second power supply VS S is written into the light-emitting drive-signal output via the switched-on ninth transistor T9, and the n-th stage light-emitting drive signal EM of low potential is output from the light-emitting drive-signal output to complete a high-and-low potential switching of the n-th stage light-emitting drive signal EM. In addition, the high potential of the second node Q also enables the sixth transistor T6 to be switched on, the low potential of the second power supply VS S is written into the first node P to maintain the low potential of the first node P, so that the seventh transistor T7 continues to be switched off.

In the subsequent period of the output phase, since the (n−1)-th stage light-emitting drive signal EM-1 and the (n+1)-th stage light-emitting drive signal EM+1 are at low potential, the second transistor T2 continuous to be switched off, although the high and low potentials of the first clock signal CKB and the second clock signal CK are switched, and the potential of the first node P is still maintained at a low potential. Moreover, although the switching between the high and low potentials of the second clock signal CK will cause the fourth transistor T4 to switch between on and off states, the potential of the second node Q will always be maintained at a high potential. Therefore, in the entire output phase, the n-th stage light-emitting drive signal EM of low potential will be continuously output from the light-emitting drive-signal output.

In the reset phase, the (n−1)-th stage light-emitting drive signal EM-1 is switched to a high potential, and as the potential of the second clock signal CK is changed to a high potential, the eighth transistor T8 is switched on, and the (n−1)-th stage light-emitting drive signal EM-1 of high potential is written into the first node P writes, and at this time, the first capacitor C1 is discharged, to enable the potential of the gate of the seventh transistor T7 to be boosted to the fifth potential, the seventh transistor T7 is switched on, and the high potential of the first power supply VDD is written into the light-emitting drive-signal output via the switched-on seventh transistor T7, and the n-th stage light-emitting drive signal EM of high potential is output from the light-emitting drive-signal output. In addition, the high potential of the first node P also enables the fifth transistor T5 to be switched on, the low potential of the second power supply VSS is written into the second node Q to maintain the low potential of the second node Q, and the ninth transistor T9 continues to be switched off.

An embodiment of the present application also provides a display panel, including the above-mentioned light-emitting drive circuit and a plurality of pixel drive circuits that are in connection with the light-emitting drive circuit, and the light-emitting drive circuit is configured to output a corresponding light-emitting drive signal to each pixel drive circuit.

It can be understood that the circuit modules illustrated in the embodiments of the present application do not constitute a specific limitation on the pixel drive circuit. In other embodiments of the present application, the pixel drive circuit may include more or fewer circuit modules than that shown in the figures, or some circuit modules may be combined, or some circuit modules may be split; each circuit module may include more or fewer devices than shown in the figures. The illustrated circuit modules may be implemented in hardware, software or a combination of software and hardware.

The technical solution provided by the embodiment of the present application includes cascaded N light-emitting drive sub-circuits, and an n-th light-emitting drive sub-circuit includes: a first pull-up control sub-circuit, a pull-up sub-circuit, a first pull-down control sub-circuit, and a second pull-down control sub-circuit and a pull-down sub-circuit, n∈[1, N]. An input of the first pull-up control sub-circuit is configured to be connected to a first power supply, a control end of the first pull-up control sub-circuit is configured to receive a first clock signal and a (n+1)-th stage light-emitting drive signal, and an output of the first pull-up control sub-circuit is in electrical connection with a first node. The first pull-up control sub-circuit is configured to pull up a potential of the first node to a first potential in a trigger phase. An input of the first pull-down control sub-circuit is configured to receive a (n−1)-th stage light-emitting drive signal, a control end of the first pull-down control sub-circuit is configured to receive a second clock signal, and an output of the first pull-down control sub-circuit is in electrical connection with the first node. The first pull-down control sub-circuit is configured to pull down the potential of the first node a second potential in an output phase, and to pull up the potential of the first node to a third potential in a reset phase. An input of the pull-up sub-circuit is configured to be connected to the first power supply, a control end of the pull-up sub-circuit is in electrical connection with the first node, and an output of the pull-up sub-circuit is in electrical connection with a light-emitting drive-signal output. The pull-up sub-circuit is configured to pull up a n-th stage light-emitting drive-signal output from the light-emitting drive-signal output to a high potential in a case that the potential of the first node is the first potential or the third potential. An input of the second pull-down control sub-circuit is configured to receive the first clock signal and to be connected to the first power supply, respectively, a control end of the second pull-down control sub-circuit is configured to be connected to the first node and to receive the second clock signal respectively, and an output of the second pull-down control sub-circuit is in electrical connection with the second node. The second pull-down control sub-circuit is configured to pull up the potential of the second node to a fourth potential in the output phase. An input of the pull-down sub-circuit is configured to be connected to the second power supply, a control end of the pull-down sub-circuit is in electrical connection with the second node, and an output of the pull-down sub-circuit is in electrical connection with the light-emitting drive-signal output. The pull-down sub-circuit is configured to pull down the n-th stage light-emitting drive-signal output from the light-emitting drive-signal output to a low potential in a case that the potential of the second node is the fourth potential. In the above solution, the light-emitting drive sub-circuit of each stage can modulate a desired light-emitting control signal through the first pull-up control sub-circuit, the pull-up sub-circuit, the first pull-down control sub-circuit, the second pull-down control sub-circuit, the pull-down sub-circuit and their corresponding connection relations, only a small number of sub-circuits is adopted, thereby the architecture of the light-emitting drive circuit can be simplified and thus the complexity of the light-emitting drive circuit architecture is reduced.

In the above embodiments, the descriptions of each embodiment have their own emphases, and for parts that are not detailed or recorded in a certain embodiment, references may be made to the relevant descriptions of other embodiments.

In addition, the size ratio relationship among the various components in the drawings is only schematic, which may not necessarily reflect the actual size ratio relationship between the various components.

In the description of this application, orientations or positional relationships indicated by terms such as "central", "longitudinal", "transverse", "upper", "lower", "front", "rear", "left", "right", "vertical", "horizontal", "top", "bottom", "inner", "outer", etc., are based on the orientations or positional relationships shown in the drawings, which are only used for the convenience of describing the present application and simplifying the description, rather than indicating or implying that a device or element referred to must have a particular orientation, be constructed, and operated in a particular orientation, and thus should not be construed as limiting the present application.

In the description of the present application, it should be noted that unless otherwise specified and limited, the terms "installation", "in connection with", and "connected to" should be understood in a broad sense, for example, it may be a fixed connection, a detachable connection, or an integration; it may be a mechanical connection or an electrical connection; it may be directly connected or indirectly connected through an intermediary, and it may also be an internal communication of two components. Those of ordinary skills in the art can understand the specific meanings of the above terms in the present application based on specific situations.

It should be understood that the term "comprising", when used in the specification and claims of the present application, indicates a presence of described features, integers, steps, operations, elements and/or components, but does not exclude the presence or addition of one or more other features, wholes, steps, operations, elements, components and/or combinations thereof.

In the description of the present application, unless otherwise specified, "/" means that the objects associated with each other are an "or" relationship, for example, A/B may mean A or B. the expression "and/or" in the present application is only an association relationship describing associated objects, which means that three kinds of relationships may be included, for example, A and/or B, may include three cases, that is, A exists alone, both A and B exist, and B exists alone, among which A, B C may be singular or plural.

In addition, in the description of the present application, unless otherwise specified, the phrase "a plurality of" means two or more than two. "at least one of the following" or similar expressions refer to any combination of these items, including any combination of single items or plural items. For example, at least one of a, b, or c may include that: a, b, c, a-b, a-c, b-c, or a-b-c, wherein a, b, c may be singular or plural.

In addition, in the description of the specification and the appended claims of the present application, the terms "first", "second", "third" and so on are used to distinguish similar objects, and are not necessarily used to describe a specific order or sequence order. It should be understood that the terms used in this way are interchangeable under appropriate circumstances such that the embodiments described herein can be practiced in other orders other than those illustrated or described herein.

References to "one embodiment" or "some embodiments" or the like described in the specification of the present application mean that a particular feature, structure or characteristic described in connection with that embodiment is included in one or more embodiments of the present application. Thus, appearances of the phrases "in one embodiment," "in some embodiments," "in other embodiments," "in some other embodiments," etc. in various places in this specification are not necessarily all refer to the same embodiment, but mean "one or more but not all embodiments" unless specifically stated otherwise.

Finally, it should be noted that: the above embodiments are only used to illustrate the technical solutions of the present application, and are not intended to limit the present application. Although the present application has been described in detail with reference to the foregoing embodiments, those of ordinary skills in the art should understand that the technical solutions described in the foregoing embodiments may still be modified, or some or all of the technical features thereof may be equivalently replaced; and these modifications or replacements do not make the essence of the corresponding technical solutions deviate from the scope pf the technical solutions of the various embodiments of the present application.

What is claimed is:

1. A light-emitting drive circuit, comprising: cascaded N light-emitting drive sub-circuits, and an n-th light-emitting drive sub-circuit comprising: a first pull-up control sub-circuit, a pull-up sub-circuit, a first pull-down control sub-circuit, a second pull-down control sub-circuit, and a pull-down sub-circuit, wherein, n∈[1, N];

wherein an input of the first pull-up control sub-circuit is configured to be connected to a first power supply, a control end of the first pull-up control sub-circuit is configured to receive a first clock signal and a (n+1)-th stage light-emitting drive signal, an output of the first pull-up control sub-circuit is in electrical connection with a first node, and the first pull-up control sub-circuit is configured to pull up a potential of the first node to a first potential in a trigger phase;

wherein an input of the first pull-down control sub-circuit is configured to receive a (n−1)-th stage light-emitting drive signal, a control end of the first pull-down control sub-circuit is configured to receive a second clock signal, an output of the first pull-down control sub-circuit is in electrical connection with the first node, and the first pull-down control sub-circuit is configured to pull down the potential of the first node to a second potential in an output phase and to pull up the potential of the first node to a third potential in a reset phase;

wherein an input of the pull-up sub-circuit is configured to be connected to the first power supply, a control end of the pull-up sub-circuit is in electrical connection with a first node, an output of the pull-up sub-circuit is in electrical connection with a light-emitting drive-signal output, and the pull-up sub-circuit is configured to pull up a n-th stage light-emitting drive-signal output from the light-emitting drive-signal output to a high potential in a case that a potential of the first node is the first potential or the third potential;

wherein an input of the second pull-down control sub-circuit is configured to receive the first clock signal and to be connected to the first power supply respectively, a control end of the second pull-down control sub-circuit is configured to be connected to the first node and to receive the second clock signal, respectively, an output of the second pull-down control sub-circuit is in electrical connection with a second node, and the second pull-down control sub-circuit is configured to pull up a potential of the second node to a fourth potential in the output phase; and wherein an input of the pull-down sub-circuit is configured to be connected to a second power supply, a control end of the pull-down sub-circuit is in electrical connection with the second node, an output of the pull-down sub-circuit is in electrical connection with the light-emitting drive-signal output, and the pull-down sub-circuit is configured to pull down the n-th stage light-emitting drive-signal output from the light-emitting drive-signal output to a low potential in a case that the potential of the second node is the fourth potential.

2. The light-emitting drive circuit according to claim 1, wherein the n-th light-emitting drive sub-circuit further comprises:

a second pull-up control sub-circuit, an end of the second pull-up control sub-circuit is in electrical connection with the control end of the pull-up sub-circuit, and another end of the second pull-up control sub-circuit is in electrical connection with the light-emitting drive-signal output, and the second pull-up control sub-circuit is configured to pull up the potential of the first node from the first potential to a fifth potential in the reset phase, and the pull-up sub-circuit is configured to pull up a potential of the n-th stage light-emitting drive-signal output from the light-emitting drive-signal output in a case that the potential of the first node is the fifth potential.

3. The light-emitting drive circuit according to claim 2, wherein the second pull-up control sub-circuit comprises a first capacitor, an end of the first capacitor is in electrical connection with the control end of the pull-up sub-circuit, and another end of the first capacitor is in electrical connection with the light-emitting drive-signal output.

4. The light-emitting drive circuit according to claim 1, wherein the first pull-up control sub-circuit comprises: a first transistor and a second transistor;
   a control electrode of the first transistor is configured to receive the first clock signal, a first electrode of the first transistor is in electrical connection with the first power supply, and a second electrode of the first transistor is in electrical connection with a first electrode of the second transistor; and
   a control electrode of the second transistor is configured to receive the (n+1)-th stage light-emitting drive signal, and a second electrode of the second transistor is in electrical connection with the first node.

5. The light-emitting drive circuit according to claim 1, wherein the second pull-down control sub-circuit comprises: a third transistor, a fourth transistor and a second capacitor;
   a control electrode of the third transistor is in electrical connection with the first node, a first electrode of the third transistor is configured to receive the first clock signal, a second electrode of the third transistor is in electrical connection with a first electrode of the fourth transistor;
   a control electrode of the fourth transistor is configured to receive the second clock signal, and a second electrode of the fourth transistor is in electrical connection with the second node; and
   an end of the second capacitor is in electrical connection with the first power supply, and another end of the second capacitor is in electrical connection with the second electrode of the third transistor.

6. The light-emitting drive circuit according to claim 1, wherein the n-th light-emitting drive sub-circuit further comprises:
   a first maintenance sub-circuit, an input of the first maintenance sub-circuit is configured to be connected to the second power supply, a control end of the first maintenance sub-circuit is in electrical connection with the first node, an output of the first maintenance sub-circuit is in electrical connection with the second node, and the first maintenance sub-circuit is configured to maintain the potential of the second node in a case that the potential of the first node is the first potential; and
   a second maintenance sub-circuit, an input of the second maintenance sub-circuit is configured to be connected to the second power supply, a control end of the second maintenance sub-circuit is in electrical connection with the second node, an output of the second maintenance sub-circuit is in electrical connection with the first node, and the second maintenance sub-circuit is configured to maintain the potential of the first node in a case that the potential of the second node is the fourth potential.

7. The light-emitting drive circuit according to claim 6, wherein the first maintenance sub-circuit comprises a fifth transistor, a first electrode of the fifth transistor is in electrical connection with the second power supply, a control electrode of the fifth transistor is in electrical connection with the first node, and a second electrode of the fifth transistor is in electrical connection with the second node; and
   the second maintenance sub-circuit comprises a sixth transistor, a first electrode of the sixth transistor is in electrical connection with the second power supply, a control electrode of the sixth transistor is in electrical connection with the second node, and a second electrode of the sixth transistor is in electrical connection with the first node.

8. The light-emitting drive circuit according to claim 1, wherein the n-th light-emitting drive sub-circuit further comprises:
   a current stabilization sub-circuit, an input of the current stabilization sub-circuit is in electrical connection with the first node, a control end of the current stabilization sub-circuit is in electrical connection with the first power supply, an output of the current stabilization sub-circuit is in electrical connection with the control end of the second pull-down control sub-circuit, and the current stabilization sub-circuit is configured to stabilize a current at the control end of the pull-up sub-circuit.

9. A method for timing control, applied to a light-emitting drive circuit according to claim 1, the method comprising:
   in a trigger phase, controlling a second clock signal line to output a low-potential second clock signal, to enable the first pull-down control sub-circuit to be switched off; controlling a first clock signal line to output a high-potential first clock signal, to enable the first pull-up control sub-circuit to be switched on when the (n+1)-th stage light-emitting drive signal is at a high potential, so that the potential of the first node is pulled up to the first potential, and the second pull-down control sub-circuit is charged;
   in an output phase, controlling the first clock signal line to output a low-potential first clock signal, to enable the first pull-up control sub-circuit to be switched off; controlling the second clock signal line to output a high-potential second clock signal, to enable the first pull-down control sub-circuit to be switched on, so that the second pull-down control sub-circuit is discharged, and the potential of the second node is pulled up to the fourth potential; and
   in a reset phase, controlling the second clock signal line to output the high-potential second clock signal, to enable the first pull-down control sub-circuit to be switched on when the (n−1)-th stage light-emitting drive signal is at a high potential, so that the potential of the first node is pulled up to the third potential.

10. A display panel, comprising:
   a light-emitting drive circuit, comprising:
      cascaded N light-emitting drive sub-circuits, and an n-th light-emitting drive sub-circuit comprising: a first pull-up control sub-circuit, a pull-up sub-circuit, a first pull-down control sub-circuit, a second pull-down control sub-circuit, and a pull-down sub-circuit, wherein, n∈[1, N];
      wherein an input of the first pull-up control sub-circuit is configured to be connected to a first power supply, a control end of the first pull-up control sub-circuit is configured to receive a first clock signal and a (n+1)-th stage light-emitting drive signal, an output of the first pull-up control sub-circuit is in electrical connection with a first node, and the first pull-up control sub-circuit is configured to pull up a potential of the first node to a first potential in a trigger phase;
      wherein an input of the first pull-down control sub-circuit is configured to receive a (n−1)-th stage light-emitting drive signal, a control end of the first pull-down control sub-circuit is configured to receive a second clock signal, an output of the first pull-down control sub-circuit is in electrical connection with the first node, and the first pull-down control sub-circuit is configured to pull down the potential of the first node to a second potential in an output phase and to pull up the potential of the first node to a third potential in a reset phase;

wherein an input of the pull-up sub-circuit is configured to be connected to the first power supply, a control end of the pull-up sub-circuit is in electrical connection with a first node, an output of the pull-up sub-circuit is in electrical connection with a light-emitting drive-signal output, and the pull-up sub-circuit is configured to pull up a n-th stage light-emitting drive-signal output from the light-emitting drive-signal output to a high potential in a case that a potential of the first node is the first potential or the third potential;

wherein an input of the second pull-down control sub-circuit is configured to receive the first clock signal and to be connected to the first power supply respectively, a control end of the second pull-down control sub-circuit is configured to be connected to the first node and to receive the second clock signal respectively, an output of the second pull-down control sub-circuit is in electrical connection with a second node, and the second pull-down control sub-circuit is configured to pull up a potential of the second node to a fourth potential in the output phase; and wherein an input of the pull-down sub-circuit is configured to be connected to a second power supply, a control end of the pull-down sub-circuit is in electrical connection with the second node, an output of the pull-down sub-circuit is in electrical connection with the light-emitting drive-signal output, and the pull-down sub-circuit is configured to pull down the n-th stage light-emitting drive-signal output from the light-emitting drive-signal output to a low potential in a case that the potential of the second node is the fourth potential; and a plurality of pixel drive circuits, connected to the light-emitting drive circuit, wherein the light-emitting drive circuit is configured to output corresponding light-emitting drive signals to the plurality of pixel drive circuits.

11. The display panel according to claim 10, wherein the n-th light-emitting drive sub-circuit further comprises:

a second pull-up control sub-circuit, an end of the second pull-up control sub-circuit is in electrical connection with the control end of the pull-up sub-circuit, and another end of the second pull-up control sub-circuit is in electrical connection with the light-emitting drive-signal output, and the second pull-up control sub-circuit is configured to pull up the potential of the first node from the first potential to a fifth potential in the reset phase, and the pull-up sub-circuit is configured to pull up a potential of the n-th stage light-emitting drive-signal output from the light-emitting drive-signal output in a case that the potential of the first node is the fifth potential.

12. The display panel according to claim 11, wherein the second pull-up control sub-circuit comprises a first capacitor, an end of the first capacitor is in electrical connection with the control end of the pull-up sub-circuit, and another end of the first capacitor is in electrical connection with the light-emitting drive-signal output.

13. The display panel according to claim 10, wherein the first pull-up control sub-circuit comprises: a first transistor and a second transistor;

a control electrode of the first transistor is configured to receive the first clock signal, a first electrode of the first transistor is in electrical connection with the first power supply, and a second electrode of the first transistor is in electrical connection with a first electrode of the second transistor; and a control electrode of the second transistor is configured to receive the (n+1)-th stage light-emitting drive signal, and a second electrode of the second transistor is in electrical connection with the first node.

14. The display panel according to claim 10, wherein the second pull-down control sub-circuit comprises: a third transistor, a fourth transistor and a second capacitor;

a control electrode of the third transistor is in electrical connection with the first node, a first electrode of the third transistor is configured to receive the first clock signal, a second electrode of the third transistor is in electrical connection with a first electrode of the fourth transistor;

a control electrode of the fourth transistor is configured to receive the second clock signal, and a second electrode of the fourth transistor is in electrical connection with the second node; and an end of the second capacitor is in electrical connection with the first power supply, and another end of the second capacitor is in electrical connection with the second electrode of the third transistor.

15. The display panel according to claim 10, wherein the n-th light-emitting drive sub-circuit further comprises:

a first maintenance sub-circuit, an input of the first maintenance sub-circuit is configured to be connected to the second power supply, a control end of the first maintenance sub-circuit is in electrical connection with the first node, an output of the first maintenance sub-circuit is in electrical connection with the second node, and the first maintenance sub-circuit is configured to maintain the potential of the second node in a case that the potential of the first node is the first potential; and a second maintenance sub-circuit, an input of the second maintenance sub-circuit is configured to be connected to the second power supply, a control end of the second maintenance sub-circuit is in electrical connection with the second node, an output of the second maintenance sub-circuit is in electrical connection with the first node, and the second maintenance sub-circuit is configured to maintain the potential of the first node in a case that the potential of the second node is the fourth potential.

16. The display panel according to claim 15, wherein the first maintenance sub-circuit comprises a fifth transistor, a first electrode of the fifth transistor is in electrical connection with the second power supply, a control electrode of the fifth transistor is in electrical connection with the first node, and a second electrode of the fifth transistor is in electrical connection with the second node; and the second maintenance sub-circuit comprises a sixth transistor, a first electrode of the sixth transistor is in electrical connection with the second power supply, a control electrode of the sixth transistor is in electrical connection with the second node, and a second electrode of the sixth transistor is in electrical connection with the first node.

17. The display panel according to claim 10, wherein the n-th light-emitting drive sub-circuit further comprises:

a current stabilization sub-circuit, an input of the current stabilization sub-circuit is in electrical connection with the first node, a control end of the current stabilization sub-circuit is in electrical connection with the first power supply, an output of the current stabilization sub-circuit is in electrical connection with the control end of the second pull-down control sub-circuit, and the current stabilization sub-circuit is configured to stabilize a current at the control end of the pull-up sub-circuit.

* * * * *